United States Patent
Fuchs et al.

(10) Patent No.: US 6,393,701 B1
(45) Date of Patent: May 28, 2002

(54) MANUALLY OPERATED ELECTRIC MACHINE TOOL

(75) Inventors: Wolfgang Fuchs, Filderstadt; Eduard Gansel, Dettenhausen; Uwe Engelfried, Ostfildern, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/367,079

(22) PCT Filed: Oct. 22, 1998

(86) PCT No.: PCT/DE98/03066

§ 371 (c)(1),
(2), (4) Date: Aug. 6, 1999

(87) PCT Pub. No.: WO99/32249

PCT Pub. Date: Jul. 1, 1999

(30) Foreign Application Priority Data

Dec. 19, 1997 (DE) .......................... 197 56 766

(51) Int. Cl.⁷ .............................. B23D 49/00
(52) U.S. Cl. ............................ 30/122; 30/392
(58) Field of Search ................... 30/122, 392, 393, 30/394, 501, 502, 208, 210, 216, 123, 144; 83/835, 750, 697, 758

(56) References Cited

U.S. PATENT DOCUMENTS

| | | | | |
|---|---|---|---|---|
| 2,573,573 A | * | 10/1951 | Jenkins | 30/392 |
| 3,360,021 A | * | 12/1967 | Mejia | 30/392 |
| 3,585,719 A | * | 6/1971 | Kivela | 30/392 |
| 4,031,622 A | * | 6/1977 | Alexander | 30/122 |
| 4,771,542 A | * | 9/1988 | Beveridge | 30/392 |
| 4,969,270 A | * | 11/1990 | Berghauser et al. | 30/392 |
| 5,806,191 A | * | 9/1998 | Yokoyama et al. | 30/216 |
| 5,819,421 A | * | 10/1998 | Giacometti et al. | 30/393 |
| 5,964,039 A | * | 10/1999 | Mizoguchi et al. | 83/835 |
| 6,018,939 A | * | 2/2000 | Nagashima | 30/210 |
| 6,021,573 A | * | 2/2000 | Kikuchi et al. | 30/393 |

FOREIGN PATENT DOCUMENTS

| | | | | |
|---|---|---|---|---|
| DE | 2236105 | * | 2/1974 | 30/216 |
| DE | 2553668 | * | 6/1977 | 30/216 |
| GB | 267313 | * | 5/1988 | 30/393 |

* cited by examiner

Primary Examiner—Kenneth E. Peterson
Assistant Examiner—Omar Flores-Sánchez
(74) Attorney, Agent, or Firm—Michael J. Striker

(57) ABSTRACT

An electrical manual power saw includes a machine housing that has a housing shaft and a housing head (102) holding an interchangeable tool, and an electrical drive for driving the tool in an oscillating reciprocating motion. The housing shaft, for the sake of attaining an ergonomically defined gripping position in the vicinity of an on/off switch, has a rod-like shape, and in the transition region between the rod-shaped housing shaft and the housing head, a construction is provided. The on/off switch is disposed laterally offset on the housing head, below the axis of the shaft in such a way that when the constriction is grasped by a hand of a user the thumb of the grasping hand rests on its actuation knob.

5 Claims, 5 Drawing Sheets

MANUALLY OPERATED ELECTRIC MACHINE TOOL

PRIOR ART

The invention is based on an electrical manual tool, in particular a power saw.

An electrical power saw of this type has already been proposed (DE 196 25 081 A1), in which the rearward portion of the shaft of the machine housing is embodied as a handgrip, with which the power saw is held during sawing.

ADVANTAGES OF THE INVENTION

The electrical manual tool of the invention has the advantage that as a result of the rod-like design of the entire shaft and the provision of a waist for the shaft end in the transition region to the head of the machine housing, with the attendant reduction in the circumference of the handgrip, an ergonomic, defined gripping position of the electric power tool with a secure hold in the vicinity of the on/off switch is attained. The thumb of the user rests during operation automatically in an ergonomic position on the switch, thus providing increased safety when the power tool is turned off.

By means of the provisions recited in the further claims, advantageous refinements of and improvements to the electrical manual tool of the present invention are possible.

In a preferred embodiment of the invention, a protective rib extending approximately parallel to the tool protrudes from each side of the machine housing on the underside of the head, toward the tool, of the machine housing. These protective ribs serve to protect the fingers and provide a limitation to the fingers of the user, so that they cannot accidentally come into contact with the tool or workpiece.

In an advantageous embodiment of the invention, the front or face end of the machine housing is sloped at a 45 to the shaft axis. Because of this 45 angle of the housing, an auxiliary arrangement in sawing a 45 angle is obtained when the electrical manual tool is used as a fine-cutting saw.

In an advantageous embodiment of the invention, three bearing and fastening points for clamping the machine housing to a miter box are provided on at least one and preferably on each side face of the machine housing; they are arranged such that they form the corners of the triangle. Preferably, the bearing or fastening points have one bearing rib protruding from each side of the housing and two hollow cylinders, passing through the machine housing crosswise to the shaft axis, whose cylinder openings in the housing wall are concentrically surrounded by a bearing collar formed in the housing wall. The clamping of the machine housing to the miter box is done via screws, which are passed through both hollow cylinders; the bearing collars on the cylinder openings of the hollow cylinders assure that the machine housing cannot be braced wrong or destroyed in the clamping process.

In a preferred embodiment of the invention, a retaining device is disposed on the head of the machine housing for a stop, protruding crosswise and extending crosswise along the front of the head. Such a stop has the advantage, when the electrical manual tool is used as a power saw, that the workpiece is pulled against the stop when the saw teeth are oriented for traction, so that safe and precise work is made possible.

In an advantageous embodiment of the invention, the stop is in the form of a rod-like hoop bent into a U, and the retaining device has a hollow cylinder, which passes through the machine housing crosswise to the shaft axis, so that one leg of the hoop can be inserted through it, preferably in form-locking fashion, and also has a channel, molded into the housing wall on the front end of the head of the machine housing near its underside, for bracing the other leg of the hoop that forms the stop. Axial protection to prevent the hoop from being able to fall out of the retaining device is attained, in accordance with an advantageous embodiment of the invention, in that the leg of the hoop that can be inserted into the hollow cylinder has a plunge cut, and a pressure piece is disposed in the machine housing and dips into the plunge cut in form-locking fashion through a recess in the cylinder wall of the hollow cylinder, by means of a compression spring.

In an alternative embodiment of the invention, the leg of the hoop that can be inserted into the hollow cylinder is embodied as long enough that it protrudes out of the machine housing on the side of the housing opposite the insertion side. In the region of its protruding end, this leg of the hoop is provided with a screw thread, onto which a wing nut can be screwed for fixing the leg of the hoop in the machine housing.

All the forms of embodiment of the invention described above serve, in a refinement of the invention, the purpose of ergonomic improvement in manipulating and working with the electrical manual tool.

BRIEF DESCRIPTION OF THE DRAWINGS

The invention is described in further detail in the ensuing description in terms of an exemplary embodiment shown in the drawing. Shown are.

DESCRIPTION OF THE EXEMPLARY EMBODIMENT

Figure 1:
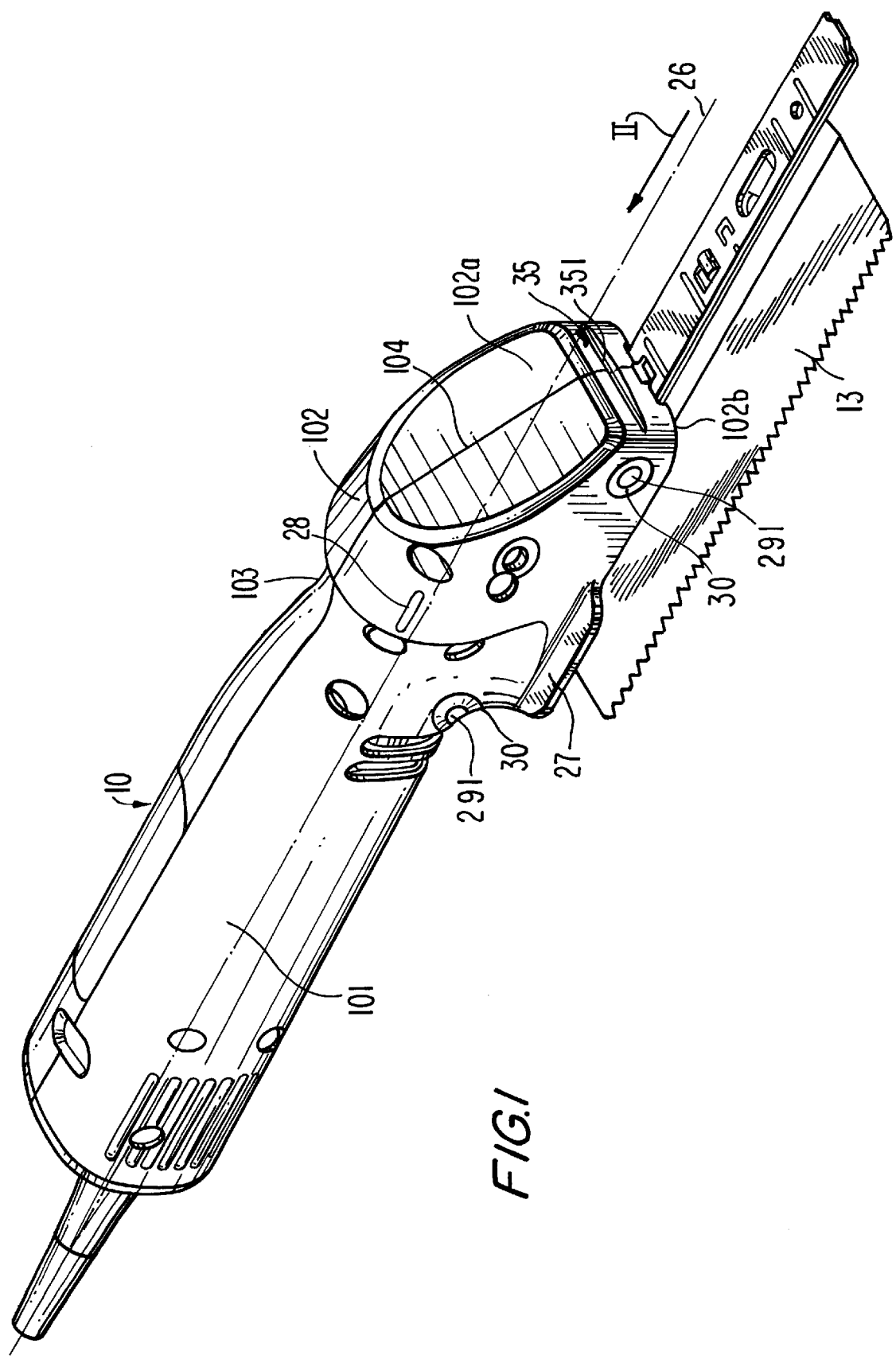
FIG. 1 is a perspective view of a power saw.

The electric power saw shown in a perspective view in FIG. 1, as an exemplary embodiment of a general electrical manual tool with a tool driven to oscillate and reciprocate, has a machine housing 10 with a rod-like shaft 101 and a head 102, and is composed of two housing half-shells. The parting seam that forms between the half-shells is marked 104 in FIG. 1. In the transition region from the shaft 101 to the head 102, the machine housing 10 has a waist so that there is a constriction 103 at that point. As can be seen from the sectional view in FIG. 3, an electric drive mechanism 11 is received in the machine housing 10 and is capable of driving a saw blade 13, retained on the underside of the head 102 by means of a chucking device 12, to execute a reciprocating, oscillating motion. The electric drive mechanism 11 has an electric motor 14 embodied here as a commutator motor, which is received in the shaft 101 and whose rotor shaft 15 extends into the constricted region of the machine housing, and also has a gear 16, disposed in the head 102, whose power take off shaft 17, oriented perpendicular to the rotor shaft 17, drives the saw blade 13 via a connecting rod drive 18. The saw blade 13 is guided axially displaceably in a guide rail 19 fixed in the chucking device 12 and is coupled to the connecting rod drive 18 via a drive prong 21, which form-lockingly engages a drive pole 20 in the saw blade 13. A crown wheel 22, which meshes with a spur gear 23 on the free end of the rotor shaft 15, is seated on the power takeoff shaft 17 in a manner fixed against relative rotation.

Figure 2:
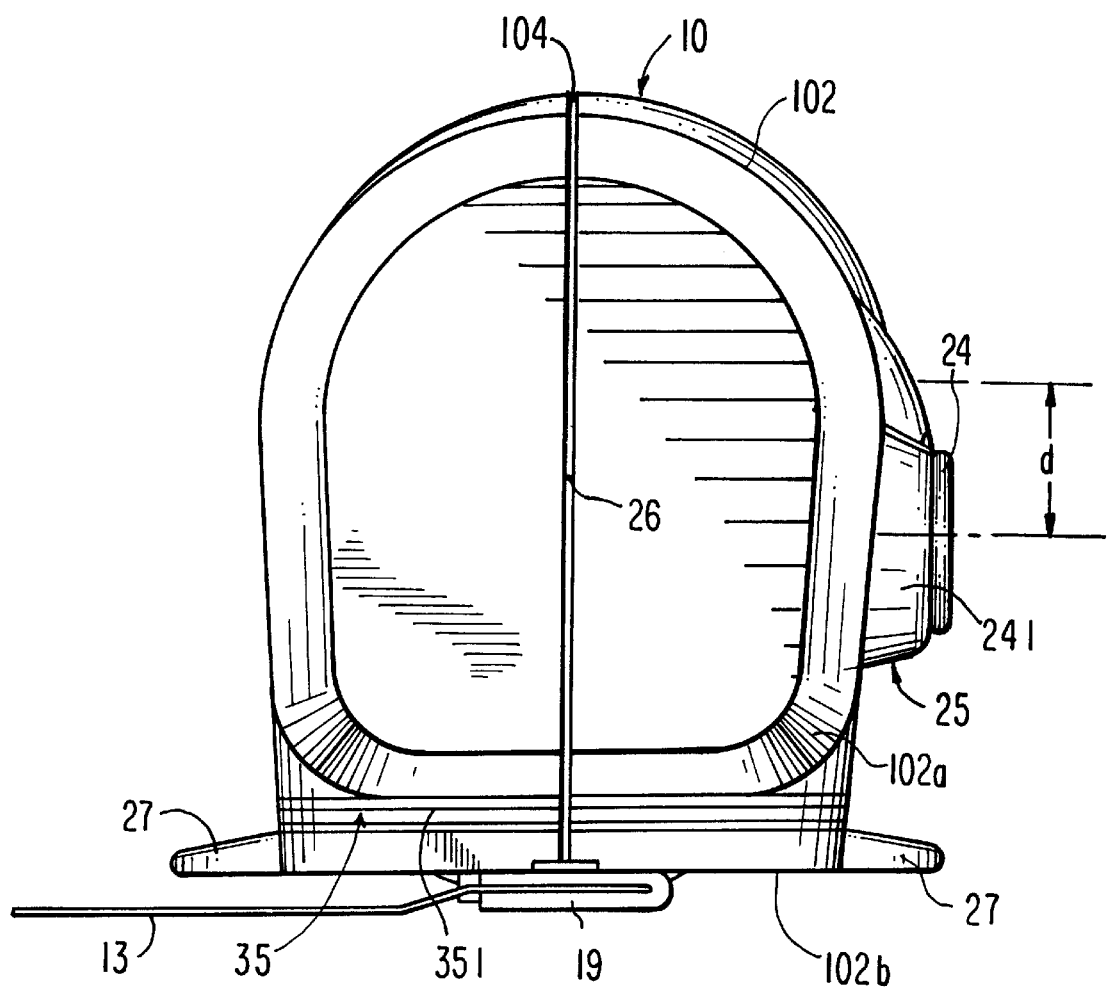
FIG. 2 is an end view of the power saw in the direction of the arrow II in FIG. 1.

As can be seen in FIG. 2, a switch slide 24 of a manual switch 25 for turning the electric motor 14 on and off is offset laterally on the head 102 of the machine housing 10 below an shaft axis 26 (shown in the sectional view of the electrical power saw in FIG. 3) toward the saw blade 13 in such a way that when the constriction 103 is grasped, the thumb of the grasping hand rests on an actuation knob 241 embodied on the slide 24. The actuation knob 241 is disposed such that the switch slide 24 can be pushed into the off position of the manual switch 25 by the thumb resting on it. To allow both right-handed and left-handed use of the power saw, one switch slide 24 of the manual switch 25 may be provided on each side of the head 102.

To protect the fingers of the grasping hand, a protective rib 27 extending approximately parallel to the saw blade 13 protrudes from the underside of the head 102, that is, the side of the head toward the saw blade 13, on each side of the machine housing (FIGS. 1 and 2). The two protective ribs 27, which are formed integrally onto the machine housing 10, prevent the fingers from mistakenly coming into contact with the saw blade 13.

Figure 3:
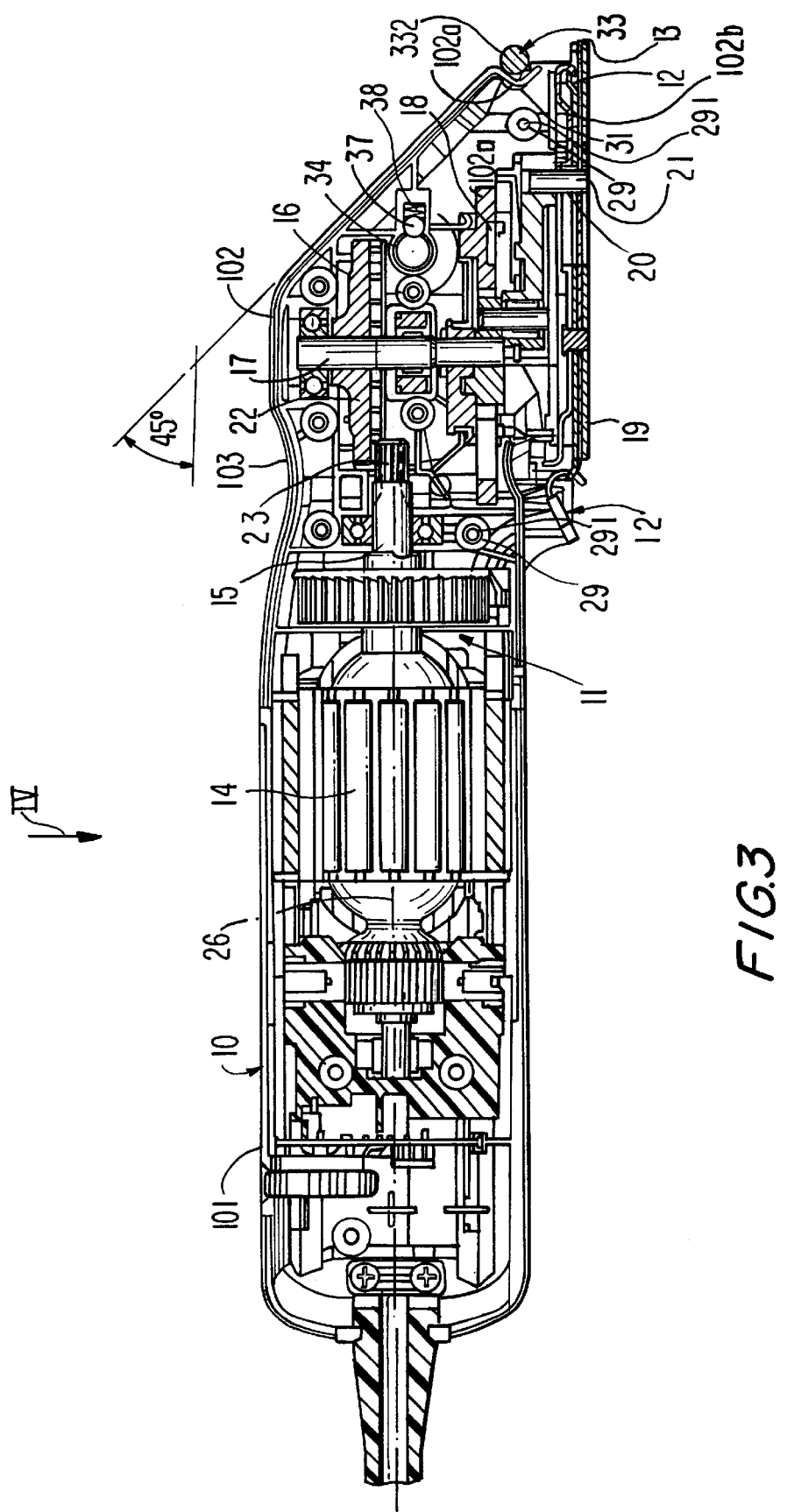
FIG. 3 is a longitudinal section through the power saw of FIG. 1.
Figure 5:
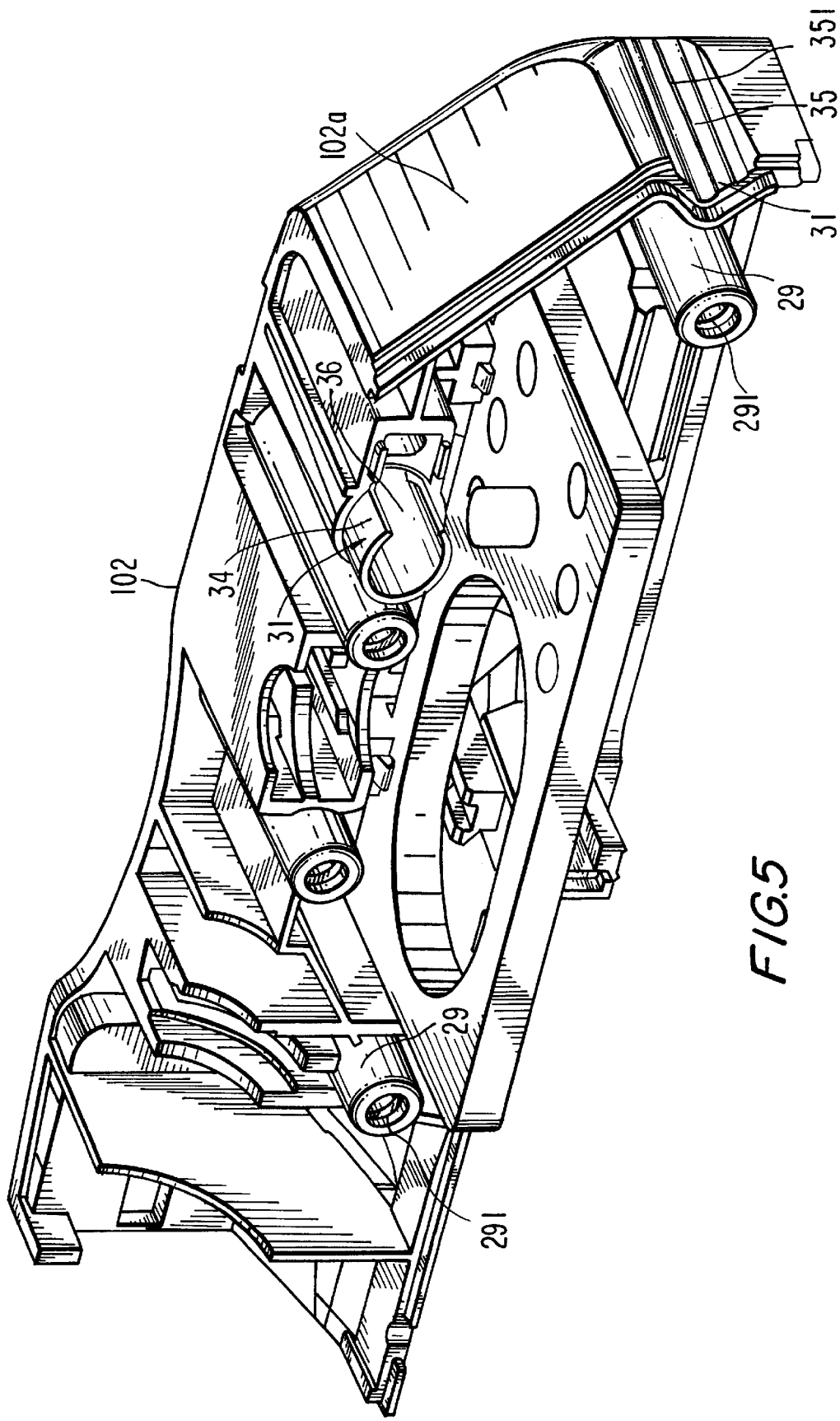
FIG. 5 is a perspective view of a detail of the machine housing.

As suggested in FIG. 3 but as can also be seen from FIGS. 1 and 5, the front or face end 102a of the head 102 is sloped at an angle of 45° to the shaft axis 26, or to the saw blade plane parallel to the shaft axis 26. Thus the front end 102a can be used as an auxiliary arrangement when sawing a 45 angle.

As shown in FIG. 1, on each side face of the machine housing 10, three bearing points formed by two cylinder openings 291a and 291b of two hollow cylinders 29 and at a bearing rib 28, as will be explained below, and one fastening point are provided for clamping the machine housing 10 to a miter box; or base the bearing points are arranged such that they form the corners of the triangle. The bearing points surround a bearing rib 28 protruding from each side of the housing and extending parallel to the shaft axis 26. The two hollow cylinders 29 (FIGS. 3 and 5) pass through the machine housing 10 crosswise to the shaft axis 26, whose cylinder openings 291a and 291b in the housing wall are each concentrically surrounded by a bearing collar 30 embodied in the housing wall. The above mentioned fastening point is embodied by means of the hollow cylinder 34 also passing crosswise through the machine housing 10, and by a screw that can be inserted through the hollow cylinder 34 and screwed into a threaded hole in the miter box. For clamping the machine housing 10 to the miter box, two pins protruding from the miter box are introduced, to prevente torsion, into the two hollow cylinders 29, and the screw is passed through the hollow cylinder 34 and screwed into the miter box. The bearing collars 30 assure that the machine housing 10 cannot be misbraced or destroyed in the clamping operation. In FIG. 5, in a detail, one shell half of the two-shell machine housing 10 is shown in the region of the head 102. The hollow cylinders 29 and 34 are each composed of two aligned hollow cylinder segments, which are each formed integrally onto one housing shell. Each hollow cylinder segment extends approximately as far as the parting seam 104 between the two housing shells, or protrudes somewhat past it in the case of the hollow cylinder 34. When the two housing shells are put together to form the machine housing 10, the hollow cylinder segments either butt flush against one another or overlap somewhat and thus form the hollow cylinders 29 and 34. One hollow cylinder 29 is formed near the corner point of the front or face end 102 and the underside 102b of the head 102, and one hollow cylinder 29 is formed in the region of the constriction 103.

Figure 4:
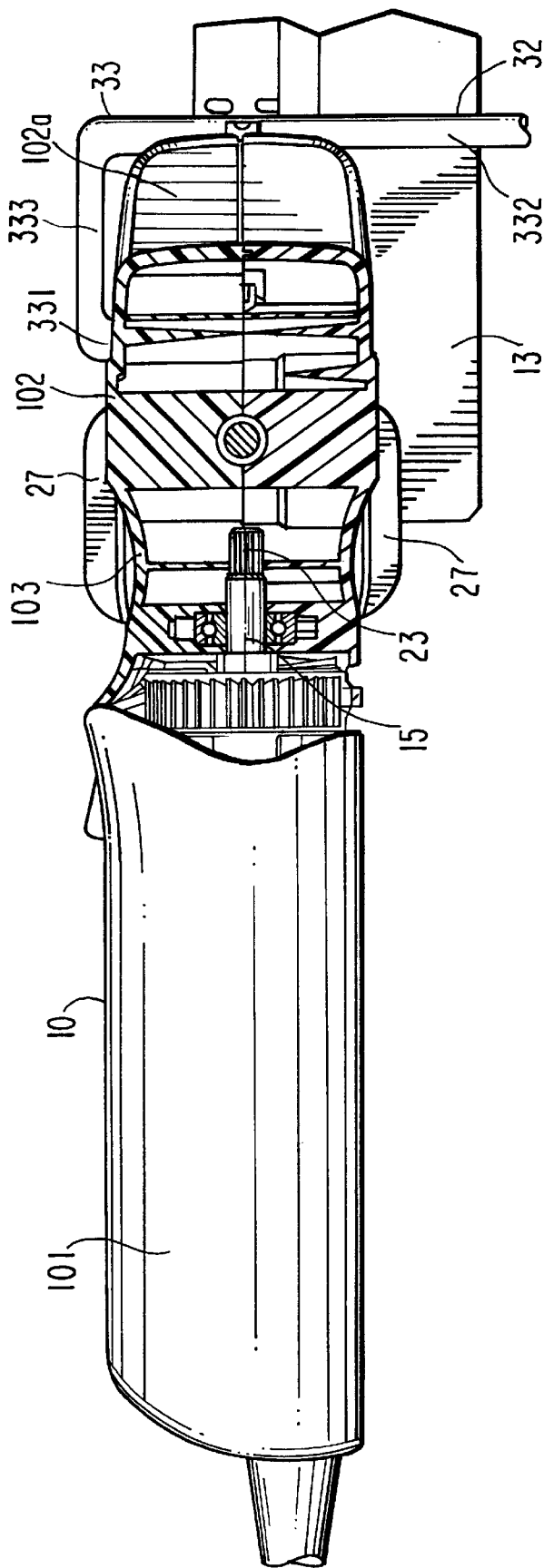
FIG. 4 is a plan view of the power saw, partly in section, seen in the direction of the arrow IV in FIG. 3.

As shown in FIG. 4, on the head 102 of the machine housing 10 there is a retaining device 31 for a stop 32 extending crosswise along the front end 102a of the head 102 below the 45° slope and extending past the saw blade 13. Such a stop is especially advantageous when the saw blade teeth are set up for traction, since the workpiece is pulled against the stop 32 and thus additionally fixed. The stop 32 is embodied by a rod-like hoop 33, bent into a U, with two legs 331, 332 and one crosspiece 333 joining the two legs 331, 332 of the hoop to one another. The retaining device 31 is composed of the hollow cylinder 34 (FIGS. 3 and 5), passing through the machine housing 10 crosswise to the shaft axis 26, and a channel 35, molded into the housing wall on the front end 102a of the head 102 below the 45 slope, which channel is provided with longitudinally extending gripping ribs 351. As already noted and as shown in FIG. 5, the hollow cylinder 34 is composed of the two hollow cylinder segments each formed onto one housing shell of the machine housing 13, which when the two housing shells are put together overlap approximately centrally in the hollow cylinder 34, a recess 36 in the hollow cylinder wall is provided, through which a pressure piece 37 passes under the force of a compression spring 38 (FIG. 3). For use of the stop 32, the hoop 33 is inserted from one side of the housing with one leg 331 into the hollow cylinder 34, until it assumes the position shown in FIG. 4. In this position, the leg 331 of the hoop rests with a shaft plunge cut in the region of the recess 36 in the hollow cylinder 34, so that the thrust piece 37, under the force of the compression spring 38, penetrates the shaft plunge cut and secures the hoop 43 from falling out unintentionally. The other leg 332 of the hoop rests in the channel 35 and is located crosswise to the sawing direction, forming the stop 32 for the workpiece. For fixing the hoop 33 in the machine housing 10, it is alternatively possible to dispense with the recess 36 in the hollow cylinder 34 and the thrust piece 37 with the compression spring 38. The leg 331 of the hoop that is to be inserted into the hollow cylinder 34 is then dimensioned long enough that it protrudes from the opposed side of the housing with a protruding end. A male thread is provided on the protruding end, and onto this thread a wing nut can be screwed, which then secures the hoop 33 against falling out.

What is claimed is:

1. An electrical manual power saw with an interchangeable tool comprising a machine housing (10) including a housing shaft (101) having an axis (26) and a housing head (102) receiving the interchangeable tool (13); an electric drive mechanism for driving the interchangeable tool (13) in an oscillating reciprocating motion, the electric drive mechanism having an electric motor (14) received in the housing shaft (101), a manual switch (25) for turning the housing shaft (101) on and off and a gear (16) disposed in the housing head (102) wherein:

the housing shaft (101) is essentially rod-shaped;

the machine housing (101) has a constriction (103) in a transition region between the housing shaft (101) and the housing head;

the manual switch is provided on the housing head and includes an actuation knob (241) and a slide (24) disposed on the housing head below the axis (26) of the housing shaft laterally offset therefrom towards the interchangeable tool such that upon grasping the constriction (103) by a grasping hand of an operator the thumb of the grasping hand rests on the actuation knob; and a retaining device (31) for a stop (32) extending across end side (102a) of the housing head (102) is provided on the housing head (102) of the machine housing (10), wherein the stop (32) is formed by one leg (332) of a rod-shaped hoop (33) bent into a U, and wherein the retaining device (31) has a hollow cylinder (34) piercing the machine housing (10) crosswise to the axis of the housing shaft (26) for form-locking insertion of another leg (331) of the hoop (33), and a channel (35) formed into a housing wall on the end side (102a) of the housing head (102) near an underside (102b) thereof for bracing the one leg (332) of the hoop that forms the stop (32).

2. The electrical manual power saw of claim 1, wherein another leg (331) of the hoop that is insertable into the hollow cylinder (34) has a plunge cut, and a pressure piece (36) is provided which is disposed in the machine housing (10) and which by means of a compression spring (38) dips in a form-locking fashion into the plunge cut through a recess (36) in a cylindrical wall of the hollow cylinder (34).

3. An electrical manual power saw with an interchangeable tool, comprising a machine housing (10) including a housing shaft (101) having an axis (26) and a housing head (102) receiving the interchangeable tool (13); an electric drive mechanism for driving the interchangeable tool (13) in an oscillating reciprocating motion, the electric drive mechanism having an electric motor (14) received in the housing shaft (101), a manual switch (25) for turning the housing shaft (101) on and off, and a gear (16) disposed in the housing head (102), wherein:

the housing shaft (101) is rod-shaped;

the machine housing (101) has a constriction (103) in a transition region between the housing shaft (101) and the housing head (102);

the manual switch is provided on the housing head and includes an actuation knob (241) and a slide (24) disposed on the housing head below the axis (26) of the housing shaft and laterally offset therefrom towards the interchangeable tool such that upon grasping the constriction (103) by a grasping hand of an operator the thumb of the grasping hand rests on the actuation knob (241);

and on at least one side face of the machine housing a receptacle (34) for a fastening element and three bearing surfaces (29, 28, 29) forming three bearing points (291a, 291b, 28) are provided for clamping the machine housing (10) to a base, the bearing points being disposed such that they form three corners of a triangle.

4. The electric manual power saw of claim 3, wherein the three: bearing points are formed by a bearing rib (28) protruding from a side of the machine housing and by two hollow cylinders (29) penetrating the machine housing (10) crosswise to the axis (26) of the housing shaft, for insertion of fastening elements fixed to the base, cylindrical openings (291a, 291b) are formed in a housing wall and each being concentrically surrounded by a respective bearing collar (30) embodied in the housing wall, and the receptacle (34) for the fastening element is a hollow cylinder passed through the machine housing crosswise to the axis (26) of the housing shaft for insertion therein of the fastening element that can be screwed into the base.

5. The electrical manual power saw of claim 4, wherein on each side of the housing, the bearing rib (28) is disposed on a top side of the housing head (102), one of the hollow cylinders (29) with the respective bearing collar (30) is disposed near a corner point of a front end (102a) and an underside (102b) of the housing head, and another of the hollow cylinders (29) with the respective bearing collar (30) is disposed in the region of the constriction (103).

* * * * *